Figure 1:
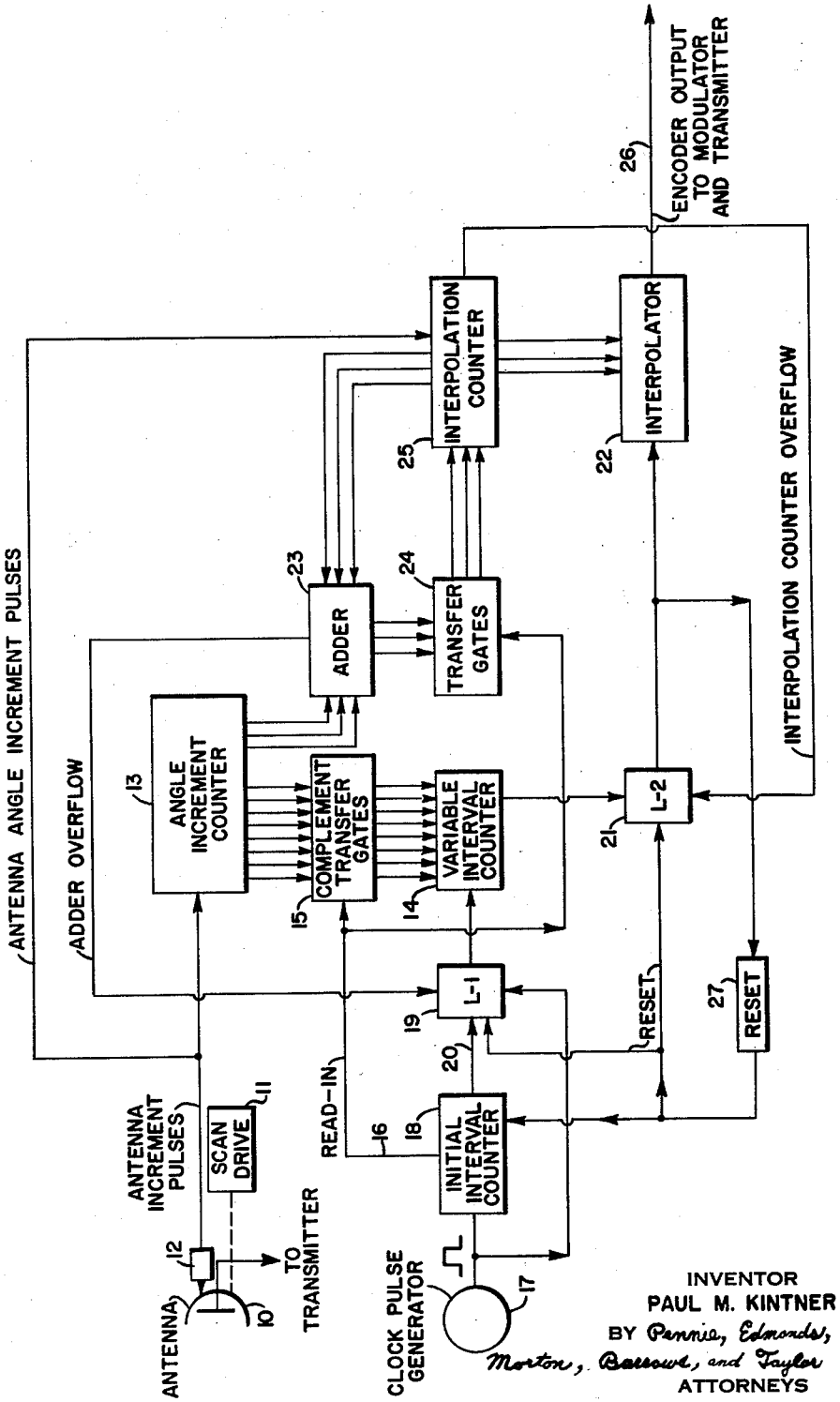

INVENTOR
PAUL M. KINTNER
BY
Pennie, Edmonds, Morton, Barrows and Taylor
ATTORNEYS June 15, 1965  P. M. KINTNER  3,189,902
PULSE ENCODER
Filed March 23, 1962  5 Sheets-Sheet 3

INVENTOR
PAUL M. KINTNER
BY
Pennie, Edmonds, Morton, Barrows and Taylor
ATTORNEYS June 15, 1965   P. M. KINTNER   3,189,902
PULSE ENCODER
Filed March 23, 1962   5 Sheets-Sheet 4
FIG. 4
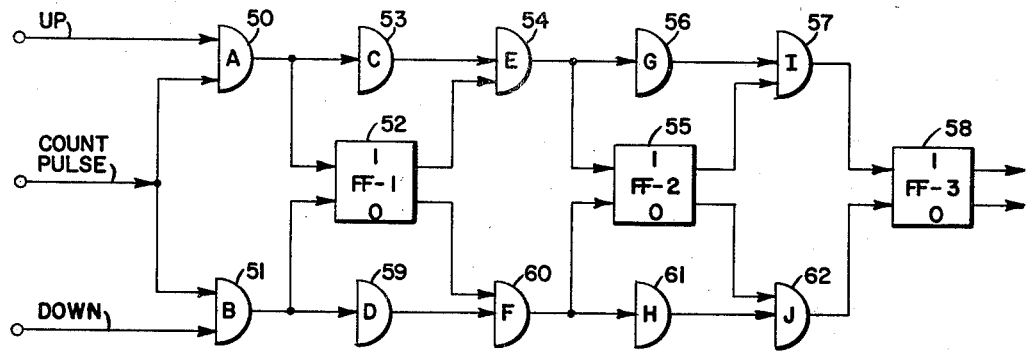
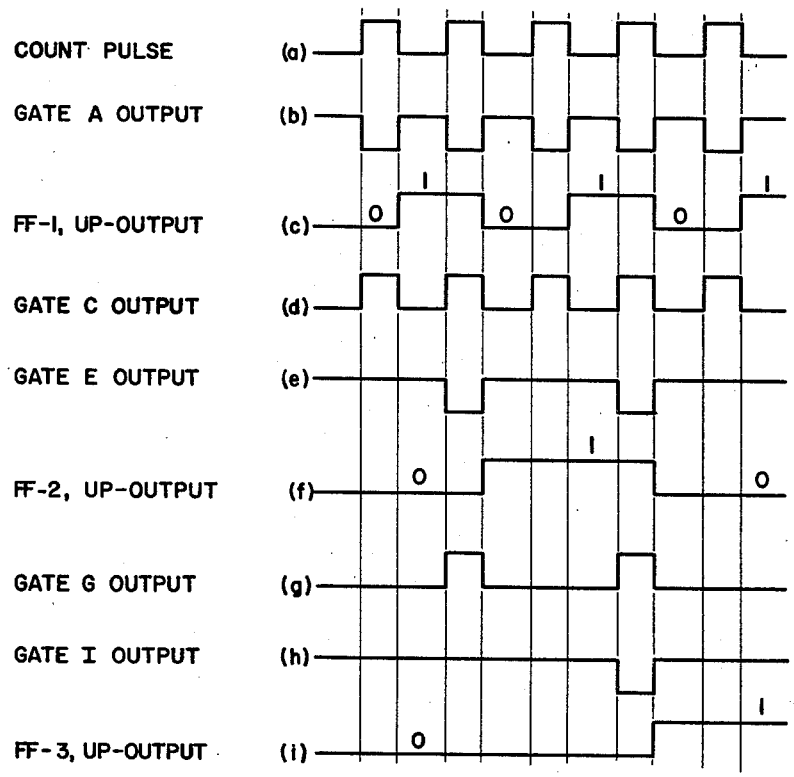
FIG. 5
INVENTOR
PAUL M. KINTNER
BY
Pennie, Edmonds, Morton, Barrows and Taylor
ATTORNEYS June 15, 1965  P. M. KINTNER  3,189,902
PULSE ENCODER
Filed March 23, 1962  5 Sheets-Sheet 5
FIG. 7
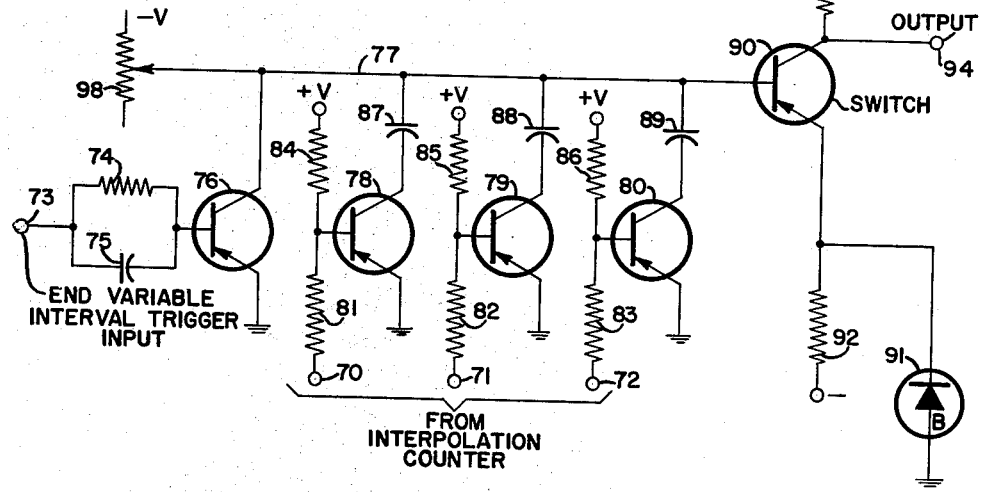
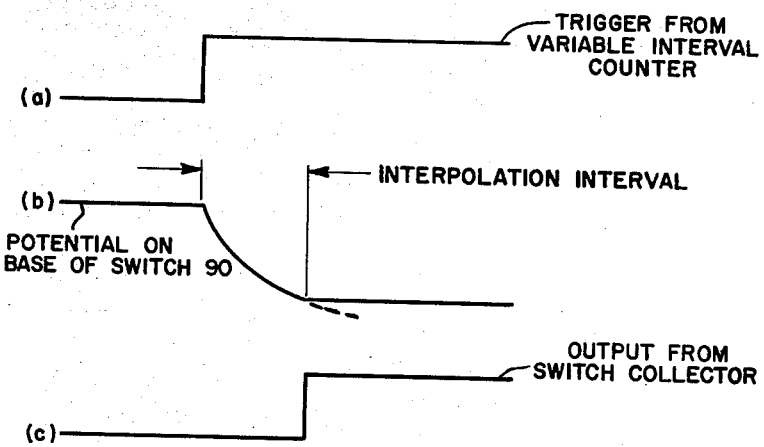
FIG. 8
INVENTOR
PAUL M. KINTNER
BY
Pennie, Edmonds, Morton, Barrows and Taylor
ATTORNEYS

United States Patent Office 3,189,902
Patented June 15, 1965

3,189,902
PULSE ENCODER
Paul M. Kintner, Huntington Station, N.Y., assignor to Cutler-Hammer, Inc., Milwaukee, Wis., a corporation of Delaware
Filed Mar. 23, 1962, Ser. No. 181,854
17 Claims. (Cl. 343—102)

This invention relates to a pulse encoder, and particularly to an encoder for a scanning beam antenna which produces coding pulses whose time spacings vary with the beam angle. The encoder is particularly useful in aircraft navigation and landing systems, but may also be used for other purposes.

In U.S. application Serial No. 27,406 filed May 6, 1960, by Battle and Tatz for "Aircraft Landing System," a system is described involving the use of a vertically scanning beam at a site near the runway. The beam is coded in terms of its elevation angle, and may be further coded for identification, so that an aircraft with suitable decoding equipment can determine its angle from the site. This information is utilized in establishing a desired landing path. Azimuth guidance can also be obtained from a scanning beam employing the same techniques used for elevation.

A pulse spacing coding is described in that application in which the time difference between successive beam pulse modulations represents the absolute beam angle from a reference angle (say 0°) the intervals between successive pulse modulations increasing progressively as the angle increases. Apparatus for producing such a pulse coding is described in which changes in the angle of the antenna are continuously indicated by means of a pickup producing an output or angle increment pulse for each small angular movement, such as 0.01 degree. The angle increment pulses are counted as they occur, and the count repeatedly determined in the course of a scanning cycle by means of timing (or "clock") pulses recurring at time spacings which are short compared to the spacings of the angle increment pulses. Successive determination of the count by the timing pulses produce beam pulse modulations at intervals proportional to successive counts. In the particular system there described, a certain minimum interval between beam pulse modulations corresponds to the reference angle, and this minimum interval is obtained by using the timing pulses to count down (or count up) a fixed interval counter before the count in the angle increment counter is determined. Also, as specifically described, to determine successive angle increment counts the count in the angle increment counter is repeatedly transferred to a variable interval counter and the timing pulses used to count down the variable interval counter to zero or some other predetermined value, at which time a beam pulse modulation is transmitted.

An overall system accuracy of the order of 0.05° is considered desirable, particularly at small beam angles. Since there may be unavoidable inaccuracies in decoding and calculating the desired landing path, it is considered desirable to transmit angular information with an accuracy of the order of 0.01°. Because of these requirements, the timing or clock pulse generator of the aforesaid application provides pulses at a very high rate, such as one every 0.04 microsecond corresponding to a pulse recurrence frequency (PRF) of 25 megacycles. The fixed and variable interval counters are required to respond during the count down to pulses having that repetition rate.

Although the digital coding system as described in the above-identified application is capable of high precision, the high frequency of digital counting requires great care in component design and construction, with consequent relatively high cost in initial construction and careful maintenance.

The present invention provides a coding system for progressive pulse spacing coding in which considerably lower counting rates may be employed than in the system above described, while still retaining substantially the same coding accuracy. This greatly facilitates the design and construction of components, and in general leads to greater reliability and less maintenance. On the other hand, as counters are developed which are capable of higher speed operation without sacrificing reliability, etc., the system of the present invention will be useful for obtaining still greater coding accuracy.

In accordance with the present invention, a relatively low pulse generator frequency is used to drive the initial interval (first) counter and the variable interval (second) counter through a count down. After the variable counter has been caused to count down, an interpolating circuit utilizing an analogue delay controlled by digital circuitry is employed to provide an incremental delay accounting for coding values between those indicated by the variable interval delay, thereby providing the desired degree of accuracy in the overall system.

The invention is described below in connection with a specific embodiment containing a number of advantageous features in addition to those mentioned above.

Figure 2:
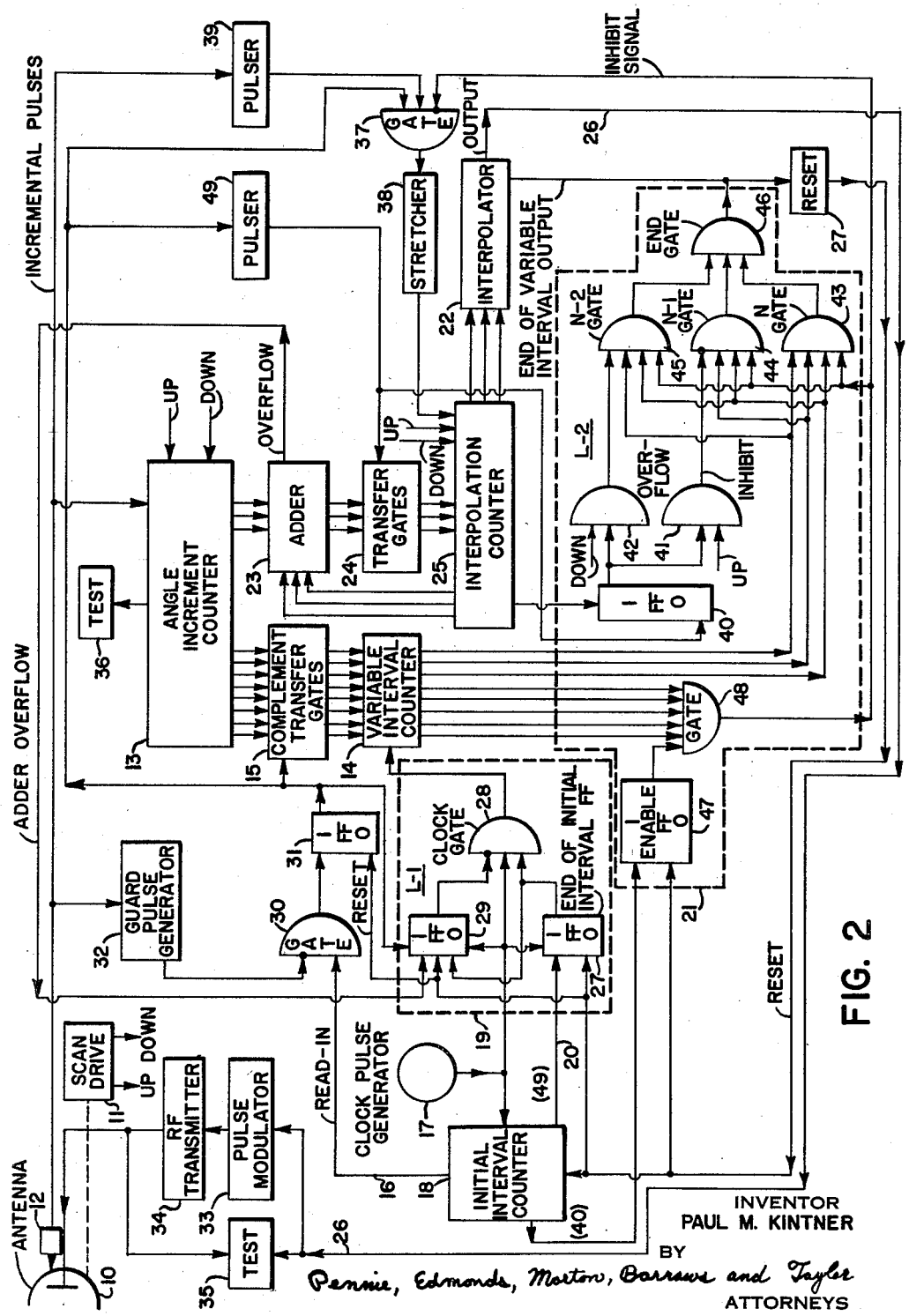
Figure 3:
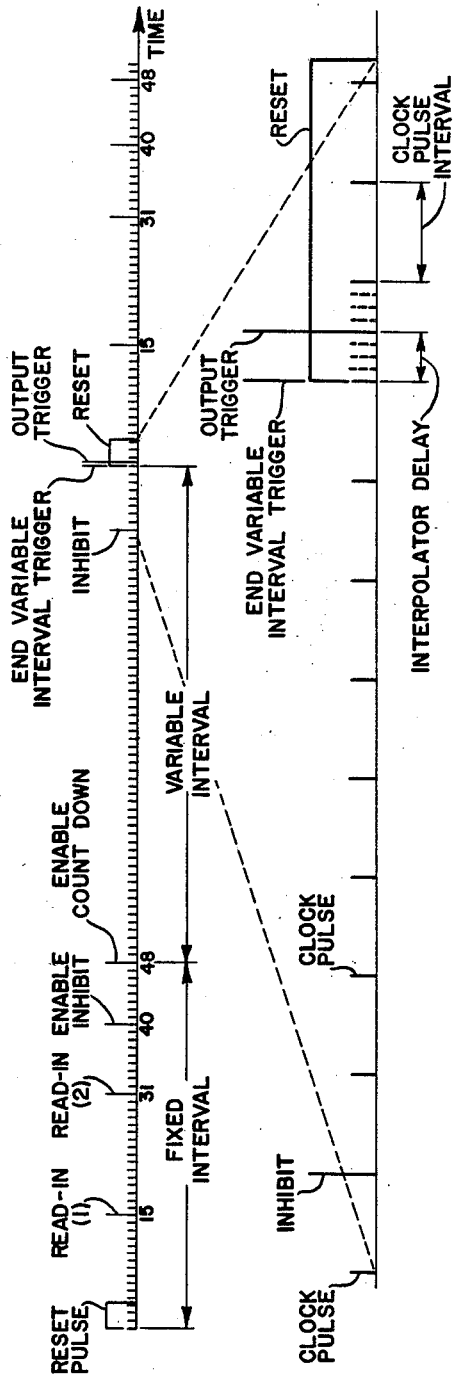
Figure 6:
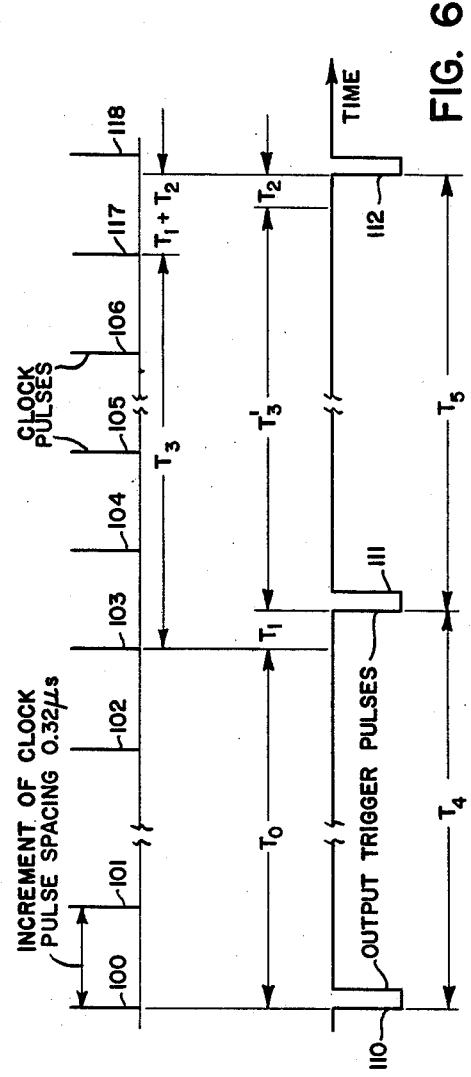

In the drawings:
FIG. 1 is a block diagram of a digital encoder in accordance with the invention;
FIG. 2 is a more detailed block diagram of the encoder of FIG. 1;
FIG. 3 illustrates the sequential relationship of pulses produced in the circuit of FIG. 2;
FIG. 4 illustrates a form of digital counter;
FIG. 5 shows illustrative waveforms of the counter of FIG. 4;
FIG. 6 illustrates certain timing relationships involved in interpolation in the circuits of FIGS. 1 and 2;
FIG. 7 is a schematic diagram of an interpolator usable in the system of FIG. 2; and
FIG. 8 shows illustrative waveforms of the interpolator of FIG. 7.

Referring to FIG. 1, an antenna 10 is shown diagrammatically, driven by a scan drive mechanism 11. Here the antenna is assumed to move bodily but other arrangements are possible such as moving the feed line through successive positions to produce an equivalent result. The scan drive mechanism is designed to change the antenna angle approximately sinusoidally. However, as explained in the above-mentioned application, only a portion of the total angle of excursion need be used, and this may be the most linear portion so that the beam angle changes approximately linearly.

In the following detailed description, specific numerical values will frequently be given as an aid to the understanding of the invention. It will be understood that these are for purposes of illustration only, and that the invention is not confined thereto.

A suitable pickup 12 is arranged to produce an angle increment pulse for each 0.01° of movement. Different types of pickups may be employed, such as photoelectric, magnetic, etc. and may be arranged to operate either directly from the antenna movement or from the scan drive mechanism. As an example, an engraved scale may be arranged in the arc of a circle about the axis of rotation of the antenna, and a photoelectric pickup arranged to derive signals from the ruled lines.

If desired, pulses may be produced by pickup 12 at, say, 0.02° angle increments, and doubled to give pulses corresponding to approximately 0.01° increments. Or, the pulses may have a duration approximately one-half the pulse intervals and the leading and trailing edges used to give pulses of one-half the initial pulse intervals, etc.

The pulses from pickup 12 are supplied to an angle increment counter 13. For a total beam angle sweep of 20°, 2000 pulses will be delivered to the counter during a scan in one direction. Consequently an eleven-stage binary counter, capable of counting from 0 to 2047, may be employed.

The most significant digits of the stored count are transferred periodically to a variable interval counter 14 by transfer gates 15 controlled by a read-in signal applied through line 16. In this specific embodiment, the complements of the stored count in 13 are transferred to 14.

A clock pulse generator 17 is provided which is capable of delivering short timing or clock pulses at a highly stable frequency. Advantageously, crystal control is employed for stability. The timing intervals are short compared to the intervals between pulses from pickup 12. The output of the pulse generator is supplied to an initial interval counter 18 and to a logic circuit 19 (L-1), respectively. When the initial interval counter has counted a predetermined number of clock pulses, it provides the read-in-signal on line 16. The initial interval counter also determines when clock pulses will be passed through the logic circuit L-1 to the variable interval counter 14, to provide a "count down" thereof.

A certain minimum time interval is employed in the transmission of angle information. Accordingly, initially pulses from generator 17 are supplied to the initial interval counter 18. The latter counts the necessary number of timing pulses to correspond to a selected minimum interval of delay, and then delivers an output pulse through line 20 to the logic circuit L-1 which causes the logic circuit to open, thereby connecting the clock pulse generator to the variable interval counter 14.

During the initial interval, and at some convenient time prior to the end thereof, the stored count in the angle increment counter 13 is transferred to the variable interval counter 14 by a read-in signal from the initial interval counter 18 to the complement transfer gates 15. This count can be identical to a predetermined number of the most significant digits in the angle increment counter, for example, the eight higher order stages. However, in this embodiment the value transferred into the variable interval counter 14 is the complement of the value in the eight higher order stages of the angle increment counter, for reasons explained below.

After the initial interval count is completed and the logic circuit L-1 is opened (which may be delayed one clock count as will be explained), the clock pulses count the variable interval counter down to zero, or to a predetermined level when the complement is used.

In the above-identified application, one specific numerical encoding relationship provides a minimum angle coding pulse spacing of 16 microseconds and a maximum of 96 microseconds. Thus, for a 20° angle sweep, the range of 80 microseconds corresponds to a change of .04 microsecond for a 0.01° change in antenna angle. In the encoder of that application 25 megacycle clock pulses, giving 0.04 microsecond spacings, allowed encoding to within 0.01°.

In the present system, a sub-multiple of 25 megacycles is employed to give the same overall encoding accuracy. As specifically employed, a 3.125 megacycle PRF is employed for the clock pulses, one-eighth of the 25 megacycles, and the pulse spacing is 0.32 microsecond. Thus, in the present system in order to decrease the frequency of the clock pulses required for counting, each clock pulse is weighted as a multiple of a single angle increment specifically, 0.08°.

When zero or a predetermined count is reached in the variable interval counter 14, it generates an output pulse which is fed to a second logic circuit 21 (L-2). The time delay between the end of the initial interval and this output pulse corresponds to the angle of the antenna within the angle represented by one clock pulse interval or 0.08°.

When the variable interval counter 14 has been counted down, the variable interval and initial interval counters 14 and 18 have completed a cycle. When the second logic circuit L-2 receives an output pulse from the variable interval counter 14, it is actuated (sometimes after a delay of one count as will be explained), and in turn actuates reset 27 to thereby reset the initial interval counter 18 and logic circuits L-1 and L-2, initiating another cycle immediately.

However, the output of the encoder in line 26 is usually delayed by some fraction of one clock period, referred to hereinafter as an interpolation delay. The interpolation delay begins when the logic circuit L-2 actuates an interpolator circuit 22. The delay is provided to correct for the fractional excess of the angle increment divided by the number of angle increment counts represented by one clock pulse, i.e. angle increments which are not transferred to the variable interval counter.

For instance, if the total angle increment count were 11, corresponding to an angle of 0.11°, then the variable interval counter would store a "1" in the binary stage representing a count of 8 and three angle increments would represent the remainder. One clock pulse would be sufficient to count the variable interval counter down to zero. But three-eighths of a clock pulse interval would remain. To provide the proper pulse angle coding for 0.11°, the interpolator introduces the appropriate additional delay for 0.03°, namely, 0.12 microsecond.

The delay corresponding to an excess value such as three-eighths of a clock pulse must be considered in determining the interpolation delay to be introduced in the next timing cycle, since it is the interval between successive output pulses in line 26 that represents the existing antenna angle. This will be explained more fully later in connection with FIG. 6.

The necessary interpolation addition is performed once per cycle of the encoder by means of an adder circuit 23, transfer gates 24, and an interpolation counter 25. For purposes of illustration, the adder and interpolation counter are assumed to include three stages. The corresponding stages of the adder 23 are connected to the last three stages of the angle increment counter 13 and the three stages of the interpolation counter 25 to provide the total of the counts appearing therein continuously. When a read-in pulse is provided to the transfer gates 24, the total in the adder is transferred into the interpolation counter to provide a new interpolation interval. As it is possible that a feedback "race" may occur around the closed loop formed by the adder, counter and transfer gates, special logic circuitry to prevent this is employed, as described below.

The interpolation counter retains the sum provided by the adder until a new input is received from the adder on the next cycle. In order that the interpolation counter be up-to-date, as angle increment pulses are likely to occur after read-in, the angle increment pulses are fed into the interpolation counter after read-in, until a predetermined time controlled by logic circuit L-2. Thus the interpolation counter not only serves for interpolating but also for updating. The interpolator is adjusted by the stages of the interpolation counter to provide the appropriate time delay.

Occasionally, the interpolation counter 25 will overflow. If it is a three-stage binary counter, the highest number it can register is seven. If an overflow condition exists, the interval provided by the variable interval counter 14 is one clock pulse interval less than it should be. This means that the total in counter 14 is short by eight angle increment pulses. If the variable interval is adjusted by one clock pulse, the correction for overflow will have been provided. A signal indicating the overflow condition is fed into the second logic circuit L-2 where it is retained by a memory unit until an output pulse is produced by the variable interval counter 14 at the end of the variable interval. At that time the appropriate adjustment of the time interval is introduced by the logic circuitry.

A similar overflow can occur in the adder 23 and this is fed into the first logic circuit L–1, wherein it causes an increase of one count in the initial interval through actuating another memory unit.

Referring to FIG. 3, the sequence of pulses in the encoder is shown including additional details described in connection with FIG. 2. Basically, the initial interval is commenced with a reset pulse. The shorter lines are clock pulses assumed to have a 0.32 microsecond separation. To allow adequate time for resetting the initial interval counter, a reset pulse with a duration of about three clock pulses is used. A slightly greater reset pulse length, say 3.5 clock pulse intervals, is actually used to allow some tolerance. The number of counts to be counted down in the initial interval counter is selected to take this into account.

Two alternative read-in pulses are provided at intervals of 15 and 31 clock pulses from the beginning of the cycle, for reasons which will be explained. After 48 clock pulses, logic circuit L–1 enables the clock pulse generator to begin the "count down" of the total stored in the variable interval counter 14. At the end of the variable interval the end variable interval trigger pulse from counter 14 occurs, and the output trigger in line 26 appears some fraction of a clock pulse later. The read-in, enable inhibit, and inhibit pulses are described in detail with reference to FIG. 2.

In FIG. 2 the overall circuitry utilized in one specific application of this invention is shown. The structure and operation of the circuit are described in detail with several variables such as clock pulse frequency, numbers of stages in counters, and time delays described numerically to provide specific examples of operation. Such numerical examples are intended to be illustrative rather than limiting.

The clock pulse generator 17 provides short pulses at 0.32 microsecond intervals, corresponding to a frequency of 3.125 mc. The initial interval counter 18 consists of six binary stages and is capable of counting as high as 63. The angle increment counter 13 comprises eleven stages and is capable of counting to 2047. The eight higher order stages (counting in increments of eight from 8 to 2040) are connected to the complement transfer gates 15. The three lower order stages (counting from 0 to 7) are connected to the adder 23. The three outputs of the adder are connected to the transfer gate 24 which are correspondingly connected to the three stages of the interpolation counter 25. The value stored in the interpolation counter 25 is continuously read into the adder 23 by connections thereto. The adder is a conventional binary adder responding to the input from the three lower order stages of the angle increment counter and the total from the interpolation counter, and providing that sum to the interpolation counter at read-in.

In this embodiment the beam is transmitted from the antenna in both directions of scan, assumed to be "Up" and "Down." During the Up scan the angle increment count is increasing, and during the Down scan it is decreasing. Accordingly, the angle increment and interpolation counters 13, 25 are arranged to be bidirectional. To provide information indicating the direction of the scan, a switching circuit in the beam drive mechanism 11 indicating the direction of scan is utilized to control the direction of adding and subtracting in the angle increment and interpolation counters. The bidirectional counters are composed of a number of multivibrators and gates which permit counting in two directions. Such a counter will be described in connection with FIGS. 4 and 5. The count in the angle increment counter is used to supply a variable time interval after a fixed interval of about 16 microseconds provided by the initial interval counter 18.

As explained above, the initial interval counter is a six-stage binary counter receiving an input of a train of clock pulses recurring at 0.320 microsecond intervals. At the beginning of a cycle the initial counter must be cleared. To assure that it is cleared reliably, the reset pulse is selected to have a duration of three clock intervals. A gate circuit in the counter blanks counting pulses during reset. During reset the counter is preset to a count of four and at the end of the reset interval begins to count clock pulses.

The end of the initial interval is recognized by an AND gate in the counter which produces an output when the first, fifth and sixth stages are in the "1" state which corresponds to a count of 49 (32+16+1=49), i.e. a binary number in the counter of 110001. Since the counter is preset to 4, only 45 clock pulses are counted to reach 49. Three clock pulses are blanked before the count begins, and two counts are provided in the variable interval counter for reasons explained below. Thus, the total initial interval is 45+3+2=50 clock pulses, or 50×0.320 microseconds=16 microseconds.

When the count of 49 is recognized, a signal from the counter switches the initial interval multivibrator 27 in the logic circuit L–1 to its "1" state on the next clock pulse. For convenience, multivibrators will often be termed "FF" for "Flip-Flop." The "1" output of FF27 is fed to a clock gate 28 which is enabled thereby in the absence of an inhibiting signal from FF29. Accordingly, the clock gate permits clock pulses from generator 17 to pass to the variable interval counter 28 to count down the total therein.

However, in the event that an adder overflow signal has occurred previously, as explained above, logic circuit L–1 provides a delay of one clock pulse. This is accomplished by FF29, which is arranged to provide an inhibit signal to the clock gate 28 when it is in its "1" state. FF29 receives an overflow input from adder 23, the "end of initial interval output" from FF27, clock pulses from 17, and a read-in signal from FF31.

The inputs to FF29 are arranged so that it is set to its "1" state at the instant of read-in signal from FF31, if an adder overflow exists simultaneously. An inhibit signal is then fed to gate 28 from FF29. The gate 28 thus remains closed when FF27 provides the end of initial interval signal. However, the end-of-interval signal enables FF29 to be reset to zero on the next clock pulse. Clock gate 28 accordingly opens on this clock pulse, thereby providing a delay of one clock pulse before the count down in variable interval counter 14 can start.

The angle increment count must be read into the variable interval counter 14 prior to the end of the initial interval. This is done during the initial interval count. An ADD gate in the initial interval counter 18 is arranged to provide an output at a count of 15, when the binary count is 001111, by using the four "1" states thereof. This output is fed through line 16 to a read-in gate 30 which normally drives a read-in FF31 to its "1" state, yielding an output trigger pulse actuating the complement transfer gates 15 and the transfer gates 24 (through pulser 49).

However, to prevent transfer from the angle increment counter 13 while it is in a transient state, as the result of a counting action, a guard pulse generator 32 provides an inhibiting input to the read-in gate 30 when an angle increment count occurs. The inhibiting pulse is selected to be longer than the period of the counting transient, say, four microseconds.

The same gate circuit in the initial interval counter 18 provides a second read-in pulse on line 16 at a count of 31 when the counter registers a binary count of 011111, since the last four bits are the same as before. By this time, which is about 5.1 microseconds after the first read-in pulse, the inhibiting pulse from generator 31 to gate 30 will have ceased. Since the spacing between angle increment pulses is on the order of 16 microseconds, both read-ins cannot be inhibited. If the first read-in signal has turned read-in FF31 to its "1" state, the second read-in signal will have no effect thereon.

The function of the variable interval counter 14 is to add to the initial interval an interval proportional to the angle of the antenna. This latter interval is determined by the count read into the counter 14 from the eight stages in the angle increment counter registering the most significant binary digits of the total angle. Although the same number can be used in the variable interval counter and counted down, it is preferred to use the complement thereof and to count up to a predetermined number. Thus, the "count down" consists of counting the stages in the variable interval counter 14 towards the "1" condition thereof.

As an illustration of this action, assume a three-stage variable interval counter and that a count of six represents the angle value. The binary representation of six is 110 and the binary complement is 001. The subsequent counting sequence during "count down" would be as follows:

| Clock Pulse | Binary Count |
|---|---|
| Read-in 0 | 001 |
| 1 | 010 |
| 2 | 011 |
| 3 | 100 |
| 4 | 101 |
| 5 | 110 |
| 6 | 111 |

The binary stages all reach the "1" state on the sixth count. If a stable clock pulse generator is used, the duration of the interval is directly proportional to the original number in the counter.

This method of counting has the advantage that the final count action does not require propagation through the stages of the counter to reset each stage; the last action requires only that the least significant binary digit change from "0" to "1" while all other binary digits remain "1."

During read-in, the complement transfer gates 15 are actuated and the "0" outputs of the angle increment counter binary stages are connected to corresponding "1" inputs of the variable interval counter stages, which were previously all at "0." Thus, any stage which is in a "0" state in the angle increment counter 13 is transferred to the variable counter as a "1"; and if a stage is in a "1" state in the former, no gate outputs will be produced so the corresponding stage in the variable interval counter will remain in the "0" state.

When an interpolation counter overflow occurs, it is necessary for the second logic circuit L-2 to extend or shorten the variable interval by one clock pulse, depending on the direction in which the antenna is moving. Thus, it is necessary to have the variable interval counter 14 count some small number of clock pulses even when generating the minimum pulse interval for an angle of zero degrees. Otherwise, for a minimum angle, the end of coarse interval would have to be produced at read-in and there would be no way to subtract one count.

To permit such adjustments the angle increment counter may register a minimum value of 24 or the binary 00000011000 for an antenna angle of zero degrees and a maximum value of 2024 or the binary 11111101000. The complements of the eight most significant binary digits in the angle increment counter are transferred to the variable interval counter providing a value of 11111100 for the minimum value of 24. On "count down," the first clock pulse produces 11111101; the second produces 11111110; and the third produces 11111111.

When, it is unnecessary to lengthen or shorten the variable interval, the second logic circuit L-2 recognizes 11111110, ending the interval. If it is necessary to lengthen the interval by one count, the logic circuit recognizes 11111111; and when it is necessary to shorten the interval, the logic circuit recognizes 11111101.

In the usual case, after two counts the logic circuit recognizes 11111110 and produces a trigger output ending the variable interval count. These are the two extra counts given to the variable interval counter but forming part of the fixed interval.

The units of the logic circuit used to provide the above recognition logic include the interpolation counter overflow FF40, an up gate 41, a down gate 42, an N gate 43, an (N-1) gate 44, an (N-2) gate 45, an end gate 46, an enable multivibrator FF47, and a coincidence gate 48.

Before the end of the variable interval, the enable multivibrator 47 has been turned to its "1" state as will be described below with reference to the interpolation counter 25. The coincidence gate 48 produces an output when the enable FF47 is "1" and the five most significant digits in the variable interval counter 14 are in the "1" state, i.e., when the counter has reached 11111000. This occurs eight counts before the counter reaches the state of being 11111111 which is a period of approximately 2.5 microseconds. The output of the coincidence gate 48 is applied to one of the inputs of the N gate, the (N-1) gate and the (N-2) gate respectively.

The N gate 43 operates when all of the outputs from the variable interval counter 14 are in the "1" state. It recognizes this condition by connections to each of the last three stages in the counter and its connection to the coincidence gate 48. The N count output represents the maximum possible variable interval length of a given number in 14, because it occurs when the count is 111111111. The count is an increase of one count over the normal (N-1) count, and is called for when the interpolation counter overflows and the antenna angle is increasing.

The (N-1) gate 44 produces an output when a count of 11111110 occurs, which occurs one count before the N count, if an overflow has not occurred. This is the normal count defining the end of the variable interval and will always occur unless an (N-2) count has occurred previously, or an inhibiting output is produced by the up-gate 41 in response to an overflow when the antenna angle is increasing. The up-gate 41 produces an output if the interpolation counter 25 overflows and sets FF40 to its "1" state and there is an UP signal applied thereto. The output of up-gate 41 produces an inhibit signal to the (N-1) gate.

The (N-2) gate 45 produces an output when the count value in the variable interval counter is 11111101 or two counts from all "1's." To recognize this, it receives inputs from the coincidence gate 48 and the two other appropriate stages of counter 14. When the antenna is going down, and an interpolation counter overflow has occurred, down gate 42 causes the (N-2) gate to be effective.

When one of the (N-2), (N-1) or N gates has been actuated to produce an output, the output potential therefrom produces a trigger pulse from the end gate 46 thereby marking the end of the variable interval count. This pulse is fed to the reset circuit 27 and the interpolator 22.

The interpolator 22 will be described in more detail below. It provides an output which is received by a pulse modulator 33 driving an R-F transmitter 34 connected to antenna 10. A test circuit 35 compares the signal in the R-F transmission line with each modulating pulse from the interpolator, to ascertain whether they coincide. If they do not coincide an alarm circuit is activated. Similarly, a test circuit 36 connected to the angle increment counter 13 is provided to test the total count of angle increment pulses at the end of each scan. If the total does not equal the expected number, another alarm circuit will be activated, and the count is then formed to the correct value prior to the next scan by means not shown.

In connection with the continual reception of increment pulses from the pickup 12 it is desirable to prevent a signal from entering the interpolation counter during the period starting about 2.5 microseconds before the end of the variable interval count, to allow the interpolator's analogue circuits sufficient time to adjust to the count without interference by a newly arriving increment pulse during the process. The coincidence circuit 48, which is actuated about 2.5 microseconds before the end of the variable interval, is intended to provide an inhibiting input to a gate 37. The latter controls the application of increment pulses through pulse stretcher 38 to interpolation counter 25. The timing sequence of this pulse may be seen by reference to FIG. 3. The stretcher 38 provides a pulse of constant length to counter 25, and is primarily to remove an ambiguity which might occur if an inhibit signal is applied to gate 37 while an increment pulse is passing therethrough.

A possible problem has been avoided by use of enable multivibrator 47 to participate in opening gate 48. Without such a circuit, the inhibiting action described above would commence simultaneouly with read-in for angle increment counts below 64, as the count in the five stages of the variable increment counter 14 connected to the coincidence gate 48 would all be in the "1" state. Although the error produced would not lead to grossly incorrect operation, the period of inhibiting could be as long as 14 microseconds.

Thus the enable multivibrator 47 is actuated to its "1" state by a gate in the initial interval counter at a count of 40 therein. It is required to be "1" before the coincidence circuit 48 can produce an output. This holds the maximum length of the inhibit for low counts to about 5.5 microseconds.

Pulser 39 provides a short standard pulse to gate 37 for each angle increment pulse.

If an angle increment pulse arrives prior to read-in from counter 13 to counter 14 in a given coding cycle, it is properly registered. Thus, prior to read-in, angle increment pulses into the interpolation counter would produce an error. This is prevented by supplying the output of read-in FF31 to gate 37. Prior to read-in FF31 is in its "0" state and inhibits gate 37. After read-in it is in its "1" state and enables gate 37.

The transfer from the angle increment counter 13 to the variable interval counter 14 is to trigger inputs in the later, so that the transfer takes place quickly and no further transfer takes place thereafter in the particular coding cycle. Angle increment pulses arriving after read-in are taken into account by up-dating the count in the interpolation counter.

A pulser 49 is connected between the read-in multivibrator 31 and the transfer gates 24 to provide a short pulse and prevent a feedback "race" situation from developing around the adder-interpolation counter loop. The pulser provides a pulse of a duration less than one microsecond, so that the gate signal is removed before a change can propagate around the loop and itself produce another change.

FIG. 4 shows a digital counter having bidirectional capabilities, providing for counting forward and backward. Such counters can be used in the angle increment counter 13, and the interpolation counter 25, and are used when the antenna beam is scanned bidirectionally.

The source of pulses to be counted is connected to the inputs of two AND gates A and B (50, 51) which are opened respectively when an "up" or "down" signal is provided by a limit switch or the like connected to the antenna drive mechanism 11. Assuming that an "up" signal is provided to gate A, the process of addition is described in detail below. Subtraction occurs in an exactly analogous manner when a "down" signal is provided to gate B.

When an angle increment pulse arrives at the input to gate A, it will be opened thereby, producing an output received by the upper half of multivibrator FF–1 (52) and the input of gate C (53). The upper half of FF–1 is actuated to its "1" state by the positive going edge of the pulse (which has a negative polarity) registering a value of "1" in the counter.

FIG. 5 illustrates the waveforms in the circuit of FIG. 4. The train of count pulses indicating angle increment inputs are shown in FIG. 5a to be of positive polarity. The output of gate A is shown to be the same as the count pulse function except that the waveform is inverted to a train of negative pulses. FIG. 5c shows the output of multivibrator FF–1 providing a "0" prior to the end of the first pulse and a "1" subsequent thereto. When a "1" output is provided thereby, it is supplied to another AND gate E (54). The other input to gate E is the output of gate C which is shown by FIG. 5d to correspond to the count pulse inplut in FIG. 5a and is the inverted output of gate A.

When the next count pulse occurs it will pass through gates A, C and E to the upper input of multivibrator FF–2 (55) and change it to a "1," indicating a binary count of two in FF–2. The same pulse will register in multivibrator FF–1 producing a "0" state therein indicating a binary count of zero. Multivibrator FF–2 now supplies an input to AND gate I (57), permitting gate G (56) to pass an output from gate E through gate I when multivibrator FF–1 is again returned to a "1" condition. The third multivibrator FF–3 (58) is caused to be driven to its "1" state at the end of the fourth angle increment pulse as can be seen by reference to FIG. 5i. The outputs of gate E, FF–2, gate G and gate I are indicated by FIGS. 5e, f, g and h, respectively. The multivibrators FF–1, FF–2, and FF–3 indicate counts of one, two and four, respectively, and when all are in the "1" state, provide a total of 7, corresponding to a binary count of 111.

In counting in the reverse direction the process is analogous. Pulses pass through gates B, D, F, H and J, etc. instead of gates A, C, E, G, I. The "down" signal is on, the "up" signal is off, so the count pulses all pass through gate B and are blocked at gate A. At the output of gate B, the positive edges of the pulses turn the multivibrators to their "0" states in the same sequence that they were turned to their "1" states when counting in the forward direction. When gate F is opened by FF–1, then pulses pass through gates B, D and F to FF–2. Further description is unnecessary as the operation of the circuit will be obvious to those skilled in the art in view of the above explanation.

FIG. 6 shows the time relationship of clock pulses and periods of interpolation delay. It demonstrates the need for providing addition of the count in the adder to the count in the interpolation counter 25 to produce the correct interpolation delay.

On first impression, it would seem logical to initiate a new coding cycle at the end of the interpolation delay by means of the trigger output from the interpolator 22. Thus, the same pulse would terminate one cycle and start the next. This is undesirable because the trigger output from the interpolator is usually out of phase with the clock pulses from the clock pulse generator 17. The pulse from the logic circuit L–2 indicating the end of the variable interval is the last pulse in phase with a clock pulse toward the end of each coding cycle.

Furthermore, it is incorrect to generate an interpolation interval based only on the count in the stages representing the three least significant binary digits in the angle increment counter 13.

In FIG. 6, interval $T_0$ is a coarse interval comprising the sum of an initial interval and a variable interval between two output trigger pulses 110 and 111. It extends an integral number of clock pulses from pulse 100 to pulse 103. To interval $T_0$ is added $T_1$, which is the interpolation interval for the total coding interval $T_4$ between output pulses 110 and 111.

If the next complete coding interval $T_5$ could begin at the end of $T_4$, it would be composed of coarse interval $T_3'$ and interpolation time $T_2$ corresponding to the three least significant digits in counter 13. However, because the coarse interval counting is accomplished by the clock pulses, it actually begins with clock pulse 103 and the coarse interval is as shown at $T_3$. This is equal in duration to $T_3'$. Therefore, the proper interpolation value is represented by $T_1+T_2$. Accordingly, it is required that the interpolation value in the interpolation counter 25 be the sum of the count in the last three stages of the angle increment counter 13 and the previous interpolation value in the interpolation counter. This sum is obtained by adder 23 and is read into the interpolation counter during read-in, as explained above.

FIG. 7 shows a suitable form of interpolator circuit providing an R–C analogue delay proportional to a digital input which may be used in the circuits of FIGS. 1 and 2. It has an input terminal 73 for receiving the end-variable-interval-trigger signal from gate 46 in FIG. 2. It also has second, third and fourth inputs 70, 71 and 72 for receiving the signals from the three stages in the interpolation counter 25. It has an output terminal 94 for providing the output trigger from the encoder to line 26 in FIG. 2.

Connected to the input terminal 73 is a resistor 74 connected in parallel with a capacitor 75 to the base of a transistor switch 76, the emitter of which is connected to ground and the collector of which is connected to line 77. A negative potential $-V$ is applied through a rheostat 98 to line 77. The transistor switch 76 is normally conducting, thereby clamping line 77 to ground. When an input of positive potential indicated in FIG. 8a is applied, the switch 76 is turned off and the potential on line 77 tends to go to $-V$.

Inputs 70, 71 and 72 are respectively connected through resistors 81, 82 and 83 to the bases of transistor switches 78, 79 and 80. These bases are also connected through resistors 84, 85 and 86 respectively to a positive potential. The emitter of each of these transistors is connected to ground. The collectors are connected through capacitors 87, 88 and 89 respectively to line 77. Each of the transistor switches 78, 79 and 80 is in a conducting condition if the corresponding binary stage in the interpolation counter is in its "1" state. The capacitors 87, 88 and 89 have capacitances of relative weights corresponding to the weights of the respective binary stages, for example 600, 300 and 150 micromicrofarads.

When the first transistor switch 76 is closed by the trigger input, the potential on the line 77 changes to $-V$ if the other transistor switches are open. If any one of the second, third and fourth switches 78, 79 and 80 is closed (transistor conducting), the rheostat 98 and the respective capacitor 87, 88 or 89 provide an R–C circuit across which potential $-V$ appears. The capacitor initially tends to hold line 77 at ground as may be seen by reference to FIG. 8b; but as the capacitor charges with time the potential on line 77 will change towards $-V$ at an exponential rate.

When a predetermined potential is reached, such as $-4.7$ volts, a fifth transistor switch 90 will be closed. The base of transistor 90 is connected to line 77, the emitter is held at a fixed negative potential by a breakdown diode 91, a negative biasing source and a resistor 92, and the collector is connected to output terminal 94 and a negative potential $-V$ through a resistor 93. The breakdown diode 91 maintains a potential of approximately $-4.7$ volts on the emitter of transistor 90. When the potential of line 77 falls below the reference potential provided by the breakdown diode 91, the transistor 90 conducts and produces an output pulse at terminal 94 as indicated in FIG. 8c.

The delay provided by the interpolator depends upon the amount of capacitance from line 77 to ground. If all three transistor switches 78, 79 and 80 are closed, then all three capacitors 87, 88 and 89 are connected in parallel, thereby providing maximum capacity and a maximum RC time constant. If all three switches are open, the capacity will be zero, providing an RC time constant of zero and no time delay. By using weighting of capacities of the capacitors proportional to the binary orders of the respective stages corresponding therewith, the RC value can be controlled to provide eight values of RC time constants and therefore eight interpolation delays (including zero).

This invention has been described in connection with specific embodiments thereof. It will be understood that the coding system of the invention may be used in many different applications. Also, many modifications in the specific embodiments described may be made within the spirit and scope of the invention. When desired, selected features of the invention may be employed and others omitted.

The particular embodiment described involves a scanning beam antenna whose angle is to be encoded, and the encoder of the invention is particularly designed and adapted for this application. However, the encoder could be used in other environments when a train of input pulses represent other types of information, and it is desired to produce encoding pulses whose spacings vary progressively with the number of input pulses, and to produce this encoding repeatedly during the course of arrival of the input pulses.

I claim:
1. An encoder for producing coding pulses whose spacings progressively vary in accordance with the angle of a scanning beam antenna which repeatedly scans through a predetermined angle range, which comprises
   (a) means for generating angle increment pulses corresponding to successive positions of the scanning antenna during a scanning cycle,
   (b) a pulse counter having a plurality of different order stages for counting said pulses from a predetermined reference beam angle position,
   (c) a source of timing pulses recurring at regular intervals,
   (d) a variable interval counter,
   (e) transfer means for transferring a count corresponding to the count in a predetermined number of higher order stages of said pulse counter to said variable interval counter,
   (f) means for applying said timing pulses to said variable interval counter to change the count therein to a predetermined count and produce a corresponding variable time interval,
   (g) means for utilizing the count in the lower order stages of said pulse counter to produce an interpolation time interval,
   (h) means for adding said variable time interval and said interpolation time interval to produce an output encoding pulse,
   (i) and means for utilizing said output encoding pulse to produce a corresponding modulation of said scanning beam.
2. An encoder in accordance with claim 1 including
   (a) an interpolation counter,
   (b) means for altering the count in the interpolation counter in accordance with the count in said lower order stages of said pulse counter,
   (c) an interpolator for providing a plurality of predetermined delays,
   (d) and means for actuating said interpolator in accordance with the count in said interpolation counter to produce a delay corresponding to the interpolation time interval.
3. An encoder in accordance with claim 1 including means for reversing the direction of counting in said pulse counter in correspondence with each reversal of the direction of scanning of said antenna.
4. An encoder in accordance with claim 1 in which said pulse counter and said variable interval counter are binary counters, said transfer means transfers the binary complement of the count in said higher order stages of the pulse counter to the variable interval counter, and said timing pulses change the count in the variable interval counter in the higher count direction thereof to said predetermined count.

5. An encoder for producing coding pulses whose spacings progressively vary in accordance with the angle of a scanning beam antenna which repeatedly scans through a predetermined angle range, which comprises
  (a) means for generating angle increment pulses corresponding to successive positions of the scanning antenna during a scanning cycle,
  (b) a pulse counter having a plurality of different order stages for counting said pulses from a predetermined reference beam angle position,
  (c) a source of timing pulses recurring at regular intervals,
  (d) an initial interval counter,
  (e) means for utilizing said timing pulses to change the count in the initial interval counter to a predetermined count and produce an initial interval output signal,
  (f) a variable interval counter,
  (g) transfer means for transferring a count corresponding to the count in a predetermined number of higher order stages of said pulse counter to said variable interval counter,
  (h) means for utilizing said initial interval output signal to apply said timing pulses to said variable interval counter to change the count therein to a predetermined count and produce a corresponding variable time interval output signal,
  (i) means for utilizing the count in the lower order stages of said pulse counter to produce an interpolation time interval,
  (j) means for utilizing the variable-time interval output signal to control the initiation of the interpolation time interval,
  (k) means for producing an output encoding pulse at the end of the interpolation time interval,
  (l) and means for utilizing said output encoding pulse to produce a corresponding modulation of said scanning beam.

6. An encoder in accordance with claim 5 including
  (a) means for resetting said initial interval counter repeatedly after each variable time interval has been produced,
  (b) and means for actuating said transfer means during each initial interval count to transfer the then-existing count in the pulse counter to the variable interval counter.

7. Apparatus in accordance with claim 6 including
  (a) an interpolation counter,
  (b) an adder connected to said lower order stages of the pulse counter and to the interpolation counter to produce the sum of the counts therein,
  (c) means for transferring the adder count to the interpolation counter during the development of the initial and variable time intervals,
  (d) and means for utilizing the count in the interpolation counter to control the interpolation time interval.

8. Apparatus in accordance with claim 7 including
  (a) means for transferring counts to the variable interval counter and to the interpolation counter substantially simultaneously,
  (b) and means for supplying angle increment pulses to the interpolation counter occurring during at least a portion of the interval between said transfer and the initiation of the interpolation time interval.

9. An encoder in accordance with claim 8 in which the interpolation counter cyclically counts to a predetermined maximum count, and including
  (a) means for producing an overflow output for inputs exceeding said maximum count,
  (b) and means for changing the time of occurrence of the output encoding pulse in accordance with said overflow output.

10. An encoder in accordance with claim 9 including means for adjusting the timing of the output signal from the variable interval counter in accordance with an interpolation counter overflow output.

11. An encoder in accordance with claim 9 including
  (a) means for reversing the direction of counting in said pulse counter and in said interpolation counter in correspondence with each reversal in the direction of scanning of said antenna,
  (b) and means responsive to an interpolation counter overflow output and the direction of scanning of said antenna for changing the time of occurrence of the output encoding pulse by a timing pulse interval in opposite directions for opposite directions of scanning of the antenna.

12. An encoder in accordance with claim 7 in which said adder cyclically counts to a predetermined maximum count, and including
  (a) means for producing an added overflow output for inputs exceeding said maximum count,
  (b) and means for adjusting the timing of the output signal from the variable interval counter in accordance with the adder overflow output.

13. An encoder in accordance with claim 7 including
  (a) an interpolator having a plurality of selectably actuable delay circuits,
  (b) means for selectively actuating said delay circuits in accordance with the count in said interpolation counter to produce a delay corresponding to the interpolation time interval,
  (c) and means for applying the variable time interval output signal to said interpolator to produce said output encoding pulse after the delay introduced thereby.

14. An encoder in accordance with claim 7 including means for reversing the direction of counting in said pulse counter and in said interpolation counter in correspondence with each reversal in the direction of scanning of said antenna.

15. An encoder for receiving a train of input pulses and producing coding pulses whose spacings vary progressively in accordance with the number of received input pulses which comprises
  (a) a pulse counter having a plurality of different order stages for counting said input pulses,
  (b) a source of timing pulses recurring at regular intervals,
  (c) a variable interval counter,
  (d) transfer means for repeatedly transferring a count corresponding to the count in a predetermined number of higher order stages of said pulse counter to said variable interval counter,
  (e) means for repeatedly applying said timing pulses to the variable interval counter to change the count therein to a predetermined count and producing corresponding variable time intervals,
  (f) means for utilizing the count in the lower order stages of said pulse counter to produce interpolation time intervals, and
  (g) means for adding corresponding variable and interpolation time intervals to produce output encoding pulses whose spacings vary in accordance therewith.

16. An encoder in accordance with claim 15 in which said pulse counter and said variable interval counter are binary counters, said transfer means transfers the binary complement of the count in said higher order stages of the pulse counter to the variable interval counter, and said timing pulses change the count in the variable interval counter in the higher count direction thereof to said predetermined count.

17. An encoder for receiving a train of input pulses and producing coding pulses whose spacings vary progressively in accordance with the number of received input pulses which comprises
  (a) a binary pulse counter having a plurality of different order binary stages for counting said input pulses, (b) a source of timing pulses recurring at regular intervals,
(c) a binary variable interval counter having a plurality of different order binary stages,
(d) transfer means for repeatedly transferring the binary complement of the count in at least a plurality of stages of said pulse counter to the stages of said variable interval counter,
(e) and means for repeatedly applying said timing pulses to said variable interval counter to change the count therein to a predetermined count in the higher count direction thereof and produce an output signal thereat.

No references cited.

CHESTER L. JUSTUS, *Primary Examiner.*